(12) United States Patent
Perks

(10) Patent No.: US 6,782,939 B2
(45) Date of Patent: Aug. 31, 2004

(54) PLASTIC PANEL DOOR CONSTRUCTION

(75) Inventor: Tom Perks, Oro Station (CA)

(73) Assignee: Propias Ltd., Woodbridge (CA)

( * ) Notice: Subject to any disclaimer, the term of this patent is extended or adjusted under 35 U.S.C. 154(b) by 0 days.

(21) Appl. No.: 10/098,429

(22) Filed: Mar. 18, 2002

(65) Prior Publication Data

US 2004/0144502 A1 Jul. 29, 2004

(51) Int. Cl.⁷ .................................................. E06B 3/20
(52) U.S. Cl. .......................................... 160/235; 160/40
(58) Field of Search ........................... 160/235, 40, 41, 160/201, 229.1

(56) References Cited

U.S. PATENT DOCUMENTS

| | | | |
|---|---|---|---|
| 3,334,681 A | * | 8/1967 | Crosswell |
| 4,846,247 A | * | 7/1989 | Kessler |
| 4,972,894 A | * | 11/1990 | Machill |
| 4,979,553 A | * | 12/1990 | Lowry, III et al. |
| 5,718,276 A | * | 2/1998 | Rekret |
| 6,279,641 B1 | * | 8/2001 | Malott |

FOREIGN PATENT DOCUMENTS

GB          2072248 A          9/1981

* cited by examiner

Primary Examiner—Blair M. Johnson

(57) ABSTRACT

A plastic door is made from rigid plastic panels that hingedly secure to one another by a lateral slide interlock at adjacent edges of the panels. The panels are foldable at the interlock between a first panel position in which the panels are out of alignment with one another and a second panel position in which the panels are aligned with one another. The slide interlock has sufficient play to enable release and connection of the interlock when the panels are in the first panel position. One of the panel edges has a flex member which acts to form a weather seal between the panel edges and to also tighten the slide interlock to the extent that the play within the interlock is eliminated to block any lateral movement between the panels when the panels are in the second panel position.

4 Claims, 3 Drawing Sheets

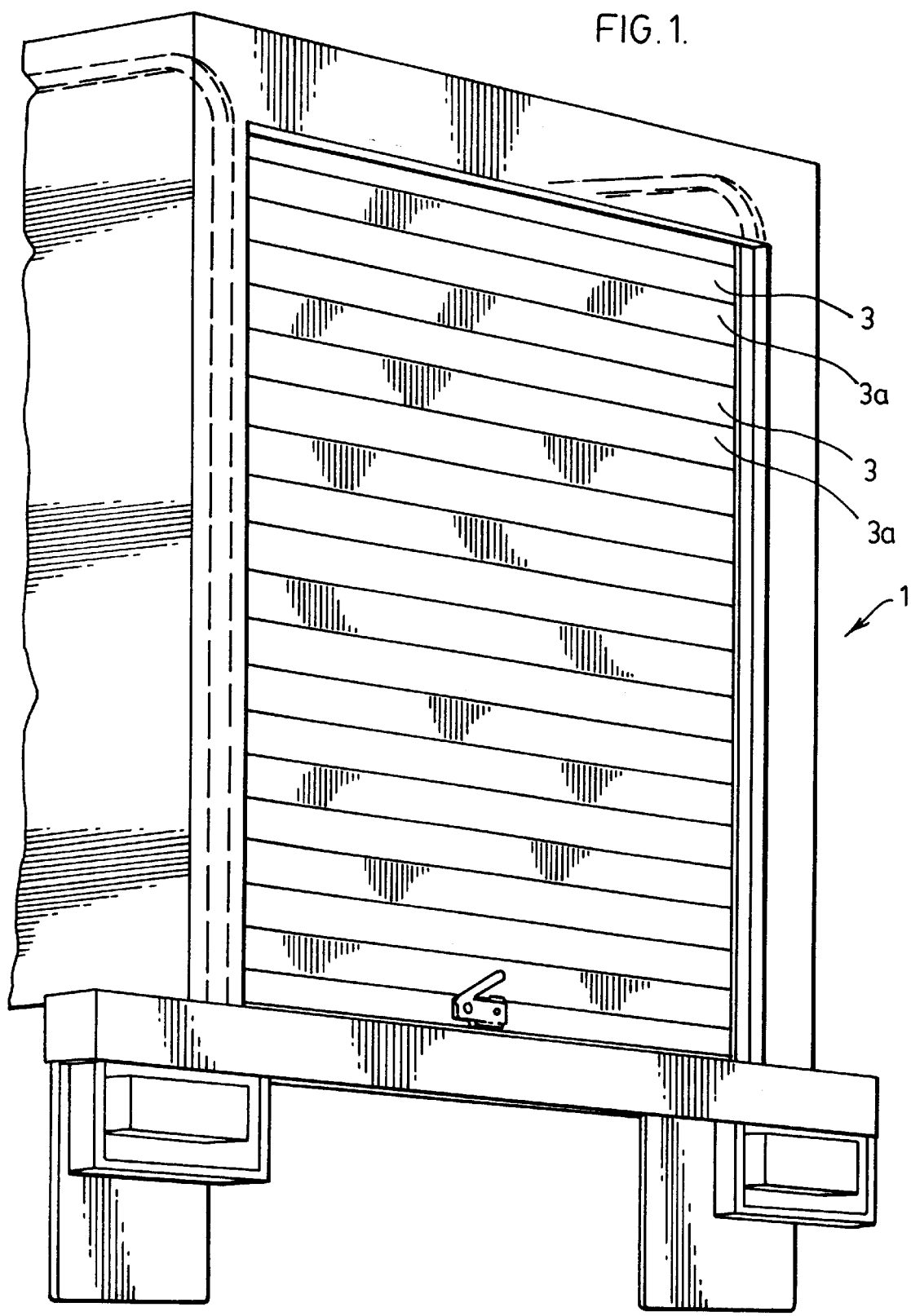

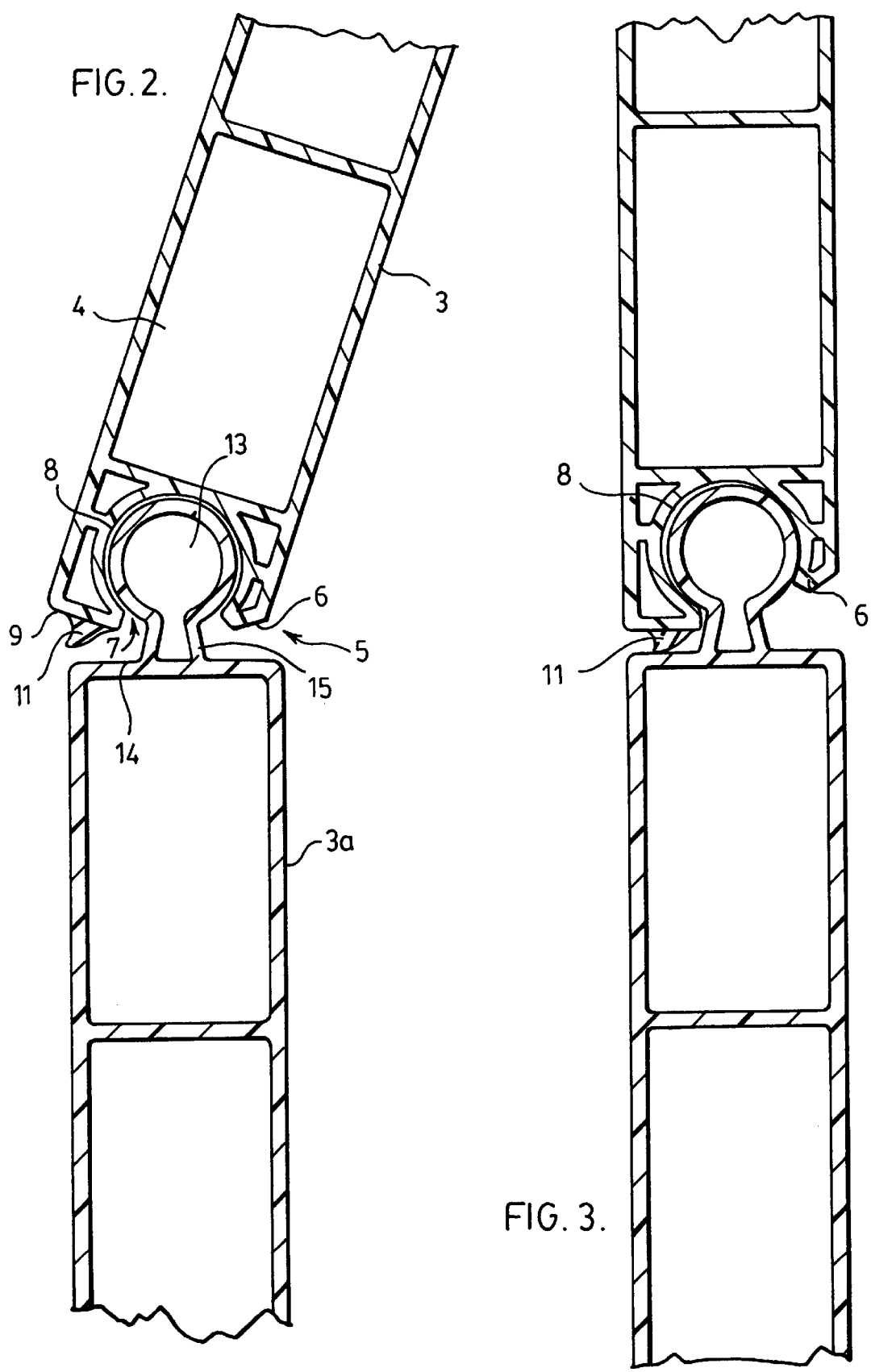

PLASTIC PANEL DOOR CONSTRUCTION

FIELD OF THE INVENTION

The present invention relates to a rolling door formed from rigid plastic panels hingedly interlocked with one another.

BACKGROUND OF THE INVENTION

Plastic material is now becoming a widely accepted replacement for metal, wood and other materials in many different industrial applications. One such application, which is known as a rolling door, comprises a plurality of door panels hingedly connected to one another. In the a rolling door, the panels align with one another when the door is closed and fold relative to one another in opening the door.

Although not currently widely available, there are some rolling doors formed from interlocking plastic panels. These doors are typically much lighter than and more easily maintained than the conventional wood or aluminum rolling panel door. However, because the panels in plastic doors are extremely light in weight, they are much more difficult to stabilize, i.e. to hold in position, relative to one another in comparison to the heavier wood and metal panels. Furthermore, most known plastic rolling doors are typically made for indoor applications and are not generally well suited to block against outdoor environmental conditions.

SUMMARY OF THE INVENTION

The present invention provides a door for covering an enclosure in which the door is made from rigid plastic panels hingedly secured to one another with means to both stabilize and weather proof the door.

More particularly, the door of the present invention which is used for covering an enclosure is made from, at least first and second rigid plastic panels hingedly secured by a lateral slide interlock at adjacent edges of the panels with one of those edges being provided with a flex member extending along the panel edge.

The panels are foldable at the interlock between a first panel position in which the panels are out of alignment with one another and a second panel position in which the panels are aligned with one another.

The slide interlock between the panels has sufficient play to enable release and connection of the interlock when the panels are in the first panel position.

In accordance with the present invention, the flex member acts to form a weather seal between the panel edges and to additionally tighten the slide interlock between the panels. Preferably the interlock is tightened sufficiently to totally eliminate the play in the interlock so as to prevent relative lateral movement.

A door having the above unique features takes advantage of the use of light weight durable plastic in the door construction while at the same time having the stability and weather proof qualities of prior art doors made of much heavier materials.

BRIEF DESCRIPTION OF THE DRAWINGS

The above as well as other advantageous and features of the present invention will be described in greater detail according to the preferred embodiments of the present invention in which FIG. 1 is a perspective view of a rolling plastic panel door used to enclose a truck trailer according to a preferred embodiment of the present invention;

FIG. 2 is an enlarged sectional view through the interlock region between any one of the two panels from the truck door of FIG. 1 with the panels out of alignment with one another;

FIG. 3 shows the panel interlock of FIG. 2 with the two panels aligned with one another;

Figure 4:
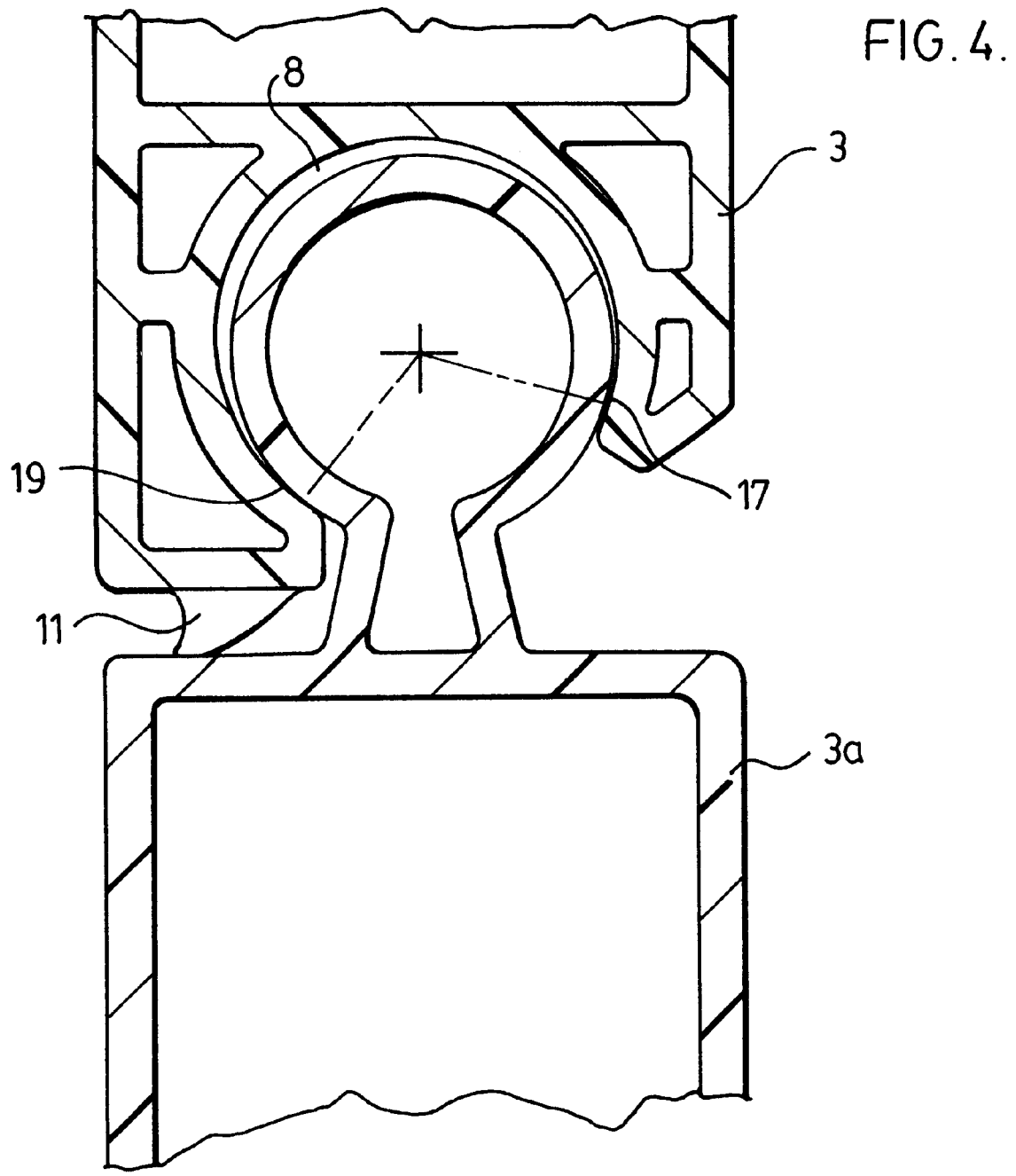
FIG. 4 is an enlarged view of the ball and socket interlock from the panels of FIG. 3.

DETAILED DESCRIPTION ACCORDING TO THE PREFERRED EMBODIMENTS OF THE PRESENT INVENTION

FIG. 1 shows a rolling door generally indicated at 1 which in this particular embodiment is used to close the back of a truck trailer. Door 1 is made from a plurality of hingedly interlocked plastic panels 3 and 3a.

Although the panels have been designated by different numerals, i.e the numerals 3 and 3a, they are in fact identical to one another in construction. For purposes of this description, the panels comprise first and second panels and FIGS. 2 through 4 show the lower end of the first panel 3 and the upper end of the second panel 3a.

The upper end of panel 3 is identical to the upper end of panel 3a and the lower end of panel 3a is identical to the lower end of panel 3.

The first and second panels have, as shown in FIGS. 2 through 4, a generally hollow-construction with plastic sidewalls and plastic ribs separating the side wall at spaced intervals along each of the panels. Each of the hollow compartments 4 between the ribs may be left hollow or may be filled with a reinforcing member for strengthening the panel. This is strictly dependent upon the end use of the panel.

Each of the panels is made from a relatively rigid plastic material such as polyvinyl chloride or the like. Glass or other suitable material may be added to the polyvinyl chloride mixture to further strengthen each of the panels.

The panels are preferably made in an extrusion process.

The two panels interlock with one another at a ball and socket type joint. This ball and socket joint to be described later in greater detail can only be assembled and disassembled by sliding the panels laterally of one another. For security purposes, the panels will not pull apart vertically of one another.

Panel 3 has a lower end formed by edge surfaces 6 and 9 to opposite sides of a generally circular opening 7 between these edge surfaces. Edge 9 extends downwardly beyond the more truncated edge 6 to allow the panels to hinge open relative to one another in the direction shown in FIG. 2 of the drawings.

The upper edge of panel 3a has a relatively flat top edge 14 with a circular head 13 supported by a smaller diameter neck 15 atop edge 14. Edge 14 provides a stop surface relative to edge surface 9 and, more particularly, the flex member on this edge surface to prevent the door from hinging in the opposite direction from that shown in FIG. 2.

As will be appreciated by the drawings, the slide interlock between the two panels is achieved by placing panel 3 above panel 3a with the two panels laterally offset from one another and by then sliding the head 13 of panel 3a into the generally circular opening 7 at the bottom of panel 3.

FIGS. 2 through 4 show that head 13 which is secured by a narrower neck to the second panel is much wider than the mouth to the opening between edge surfaces 6 and 9 of the lower edge of the upper panel thereby preventing vertical separation of the interlock.

The key to the present invention lies in the provision of a flex member 11 which extends along the length of edge portion 9 of panel 3. This flex member is preferably permanently affixed to the edge of the panel as, for example, through the use of a coextrusion process, a hot melt process, or even a permanent adhesive process.

Flex member 11 is again made from a plastic material. However, in this case, the plastic material in the flex-member has a much lower durometer than that used in forming the body of the panels.

In the preferred embodiment, flex member 11 has a somewhat triangular configuration with a wider base where attached to the panel edge and tapering to an apex like tip on the flex member.

FIG. 2 clearly shows that when the two panels are out of alignment with one another there is a gap 8 completely around the head 13 of the lower panel. This gap ensures that there is sufficient play in the interlock to allow the panels to be slid together or apart for assembling and disassembling the panels when they are in the non-aligned position.

FIGS. 3 and 4 show the panels when aligned with one another. In this aligned position, flex member 11 is collapsed or squeezed between edge 9 of panel 3 and panel edge 14 of panel 3a. This provides a weather tight seal between these two panel edges across the door. Note that the triangular shape of sealing member 11 promotes its flattening on edge 14 to provide a good wide contact surface as a weather seal with edge 14.

At the same time that the flex member is collapsed, the flex member, due to its flexible nature, wants to spring back to its normal FIG. 2 configuration. As such, flex member 11 pushes on and produces a separation of the two panels at their edges. This separating of the two panels completely changes the configuration of the gap 8 around the head 13 of panel 3a. More particularly, the separation of panels causes the mouth wall around the opening 7 in the upper panel to come into contact with and bind on the head 13 at the two areas indicated by numerals 17 and 19 in FIG. 4. This contact which extends the complete length of each panel edge eliminates the play of the head 13 within opening 7 and is preferably sufficient to prevent the two panels from moving laterally relative to one another when the panels are in their aligned positions. Accordingly, even these light weight plastic panels, will not shift out of position relative to one another under normal usage conditions of the door.

It will be seen in FIG. 4 that the shape of the upper panel edge with the raised interior edge surface elevates the contact point of the opening wall at area 17 relative to contact area 19. This is very helpful in eliminating the play in view of the fact that the flex member pushes, from one side only, of the interlock region. The unbalancing of the contact points 17 and 19 compensate for this one sided pushing action.

If desired, the mouth wall of opening 17 may be lined with a material having a high coefficient of friction to further enhance the grip of the mouthwall on ball 13.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A door for covering an enclosure, said door being formed by a plurality of rigid panels including at least first and second panels hingedly secured to one another by a ball and socket joint which is only interlockable by a sliding of the ball into the joint in a direction laterally across the door, the first and second panels each having an exterior surface and an interior surface, the first panel having a lower end and the second panel having an upper end, the lower end of the upper panel having an outer edge region beneath the exterior surface thereof and having an inner edge region beneath the interior surface thereof, the upper end of the lower panel having an outer edge region above the exterior surface thereof and having an inner edge region above the interior surface thereof, the outer edge regions of the lower end of the first panel and the upper end of the second panel being separated from the inner edge regions of the lower end of the first panel and the upper end of the second panel by the ball and socket joint, a flex member providing a panel end seal extending across the door between the outer edge regions of the lower end of the upper panel and the upper end of the lower panel, the panel end seal being permanently secured to one of the outer edge regions of the upper and lower ends of the first and second panels, the interior edge regions of the upper and lower ends of the first and second panels being spaced from one another to allow the first and second panels to hinge open at the ball and socket joint to a folded position in which the first and second panels are out of alignment with one another, the ball being undersized relative to the socket of the joint and the panel end seal being sufficiently free of compression to allow the first and second panels to slide at the ball and socket joint when in the folded position, the panel end seal being under compression and forcing the ball into a friction locked engagement within the joint to prevent the ball from sliding relative to the joint when the first and second panels are in a non folded position vertically aligned with one another.

2. A door as claimed in claim 1 wherein said flex member is made from a plastic material having a lower durometer than that of each of said panels and is coextruded along said one of said edges.

3. A door as claimed in claim 1 wherein said flex member is made from a plastic material having a lower durometer than that of said panels and is secured by a hot melt process to said one of said outer edge regions.

4. A door as claimed in claim 1 wherein said flex member has a generally triangular configuration with a wide base where affixed to said one of said outer edge regions and a much narrower tip away from said wide base.

* * * * *

UNITED STATES PATENT AND TRADEMARK OFFICE
CERTIFICATE OF CORRECTION

PATENT NO. : 6,782,939 B2  Page 1 of 1
APPLICATION NO. : 10/098429
DATED : August 31, 2004
INVENTOR(S) : Perks It is certified that error appears in the above-identified patent and that said Letters Patent is hereby corrected as shown below:

On Title Page (item 73)
Name of Assignee: Proplas Ltd.

Signed and Sealed this

Twenty-ninth Day of August, 2006

JON W. DUDAS
*Director of the United States Patent and Trademark Office*